United States Patent
Sadr et al.

[11] Patent Number: 5,900,205
[45] Date of Patent: May 4, 1999

[54] METHOD FOR BLOW MOLDING A CVJ BOOT

[75] Inventors: Changize Sadr, North York; Jamie White, Caledon East, both of Canada

[73] Assignee: Salflex Polymers Ltd., Ontario, Canada

[21] Appl. No.: 08/694,234

[22] Filed: Aug. 8, 1996

[51] Int. Cl.⁶ .................................................. B29C 49/00
[52] U.S. Cl. ........................................... 264/531; 264/506
[58] Field of Search ................................... 264/506, 531, 264/534, 533

[56] References Cited

U.S. PATENT DOCUMENTS

| | | | |
|---|---|---|---|
| 3,371,376 | 3/1968 | Fischer et al. | 264/533 |
| 3,769,394 | 10/1973 | Latreille | 264/533 |
| 4,115,496 | 9/1978 | Krall . | |
| 4,334,852 | 6/1982 | Haubert . | |
| 4,396,574 | 8/1983 | Kovacs . | |
| 4,515,842 | 5/1985 | Kovacs . | |
| 4,518,558 | 5/1985 | Anway et al. | 264/531 |
| 5,318,740 | 6/1994 | Sadr et al. | 264/506 |
| 5,525,288 | 6/1996 | Ninomiya et al. . | |

FOREIGN PATENT DOCUMENTS

| | | |
|---|---|---|
| 2011802 | 2/1993 | Canada . |
| 0 535 254 | 8/1991 | European Pat. Off. . |
| 0 599 078 | 10/1993 | European Pat. Off. . |
| 1218041 | 3/1960 | France . |
| 58 168 530 | 10/1983 | Japan . |
| 60-217127 | 10/1985 | Japan ..................................... 264/506 |
| 03 114 726 | 5/1991 | Japan . |

*Primary Examiner*—Catherine Timm
*Attorney, Agent, or Firm*—Bereskin & Parr

[57] ABSTRACT

A blow molded product which is generally tubular having first and second open ends and, a bellows section intermediate said first and second ends so that said product is flexible, has a skirt adjacent one of said first and second ends. The bellows section is formed in a blow molding operation and the skirt section is formed by compression molding. A preferred embodiment of the product has a rib extending internally of the wall of the blow molded section to strengthen the transition region between the bellows section and the compression compresses the steps of confining a parison in a mold and then introducing a core into the parison in the mold. The core moves thermoplastic material axially and possibly also radially and circumferentially. This process enables molding of a product with an external surface which may be substantially cylindrical with an internal surface which has lobes, ribs or other internal projections.

14 Claims, 12 Drawing Sheets

METHOD FOR BLOW MOLDING A CVJ BOOT

FIELD OF THE INVENTION

This invention relates generally to blow molded, hollow articles of plastic material and methods of making such articles.

Blow molding is a well-known technique used for manufacturing hollow plastic articles such as bottles and the like. Typically, a tube or "parison" of plastic material in a hot, moldable condition, is positioned between two halves of a partible mold having a mold cavity of a shape appropriate to the required external shape of the article to be molded. The mold halves are closed around the parison and pressurized air is introduced into the interior of the parison to cause it to expand and conform to the shape of the mold cavity. The mold cools the plastic material to its final rigid shape and the mold is then opened and the article removed. The parison is normally extruded through a die directly into position between the mold halves. This process is usually referred to as extrusion blow molding. Articles such as bottles having relatively wide cylindrical body portions and narrower necks can be blow molded relatively easily. However, difficulties are often encountered in blow molding articles having somewhat more unusual shapes. For example, it is difficult to successfully blow mold an article which has a relatively large diameter neck and a body portion of corrugated or other unusual shape; the body portion may be of bellows-like form so as to allow flexibility for longitudinal extensibility and compressibility and bending of the article. An example of an article of this type is a protective bellows or boot which may be used to protect various automotive components such as rack and pinion steering systems, constant velocity joints and the like. In order to successfully mold the corrugations defining the bellows-like portion of an article of this type, a relatively small diameter parison must be used. If the parison has too large a diameter, "webs" will be formed between the corrugations and the flexibility of the bellows-like portion of the article will be lost. On the other hand, with a relatively small diameter parison it is difficult to successfully form the neck portion of the article.

A number of patents and references disclose various techniques for mechanically expanding a portion of a parison in order to facilitate molding of articles having unusual shapes. See for example, U.S. Pat. No. 4,515,842 issued May 7, 1985, U.S. Pat. No. 4,396,574 issued Aug. 2, 1983 and U.S. Pat. No. 4,334,852 issued Jun. 15, 1982, all assigned Supreme Casting and Tooling. These patents all deal with corrugated articles having a bellows-like section and teach various means for mechanically stretching a parison which is extruded with a relatively narrow diameter to a much larger diameter prior to the blow molding operation.

One of the more common uses for bellows-like blow molded structures is for encapsulating automotive components whose alignment may change in use. Typical examples are steering components such as rack and pinion steering systems as well as constant velocity joints commonly used in a power train, particularly in front wheel drive automobiles. A constant velocity joint must permit the changes in angles which constantly occur as the vehicle travels down the road. In order to keep the lubrication required for long life of the joint in place, the joint is surrounded by a bellows-like boot. The bellows serves to keep the desired lubrication in and dirt, salt and other foreign materials out of the joint. Typically, a boot of this type includes a clamping surface at either end of the boot so that the boot may be attached to the shaft-like structures with a central bellows section providing the protective function as well as providing the necessary flexibility to the boot.

Boots of this type may be manufactured from a number of different materials. One such material is rubber. More recently, boots of this type have been manufactured from thermoplastic materials such as the thermoplastic resin identified under the trade mark HYTREL available from E.I. Dupont & Company. HYTREL material is more desirable than rubber in that it appears to have superior flex fatigue, abrasion, low temperature start, vacuum collapse and high speed expansion characteristics as compared to rubber. One area in which rubber boots exhibit superior performance is in dynamic impact to the boot when installed on a flexible joint.

In the manufacture of constant velocity joints, a boot is put in place and the mechanical components joined together. The constant velocity joints may then be shipped from the manufacturer of the joint to the automobile assembly location. This handling of the joint between its original manufacture and assembly and its transport to an automotive assembly plant and assembly in the automotive plant all give rise to impact loads some times applied to the boot. Similarly, when the boot is applied to a vehicle, stones or other debris on the road may be thrown into the boot, again delivering impact to the boot.

It has been noted that boots of this type when manufactured from HYTREL may become prone to failure at the region where the skirt portion of the boot, made to accommodate one of the clamping means, merges into the bellows or flexible portion of the boot. It appears that the transition region between the internal support provided by the internal surface to which the boot is clamped and the region of the boot that no longer bears against metallic material is a location for failure.

Accordingly, it is desirable to produce a boot which has good strength in the region where the clamping surface merges into the flexible portion.

Traditionally, blow molding techniques have not been satisfactory for manufacturing internal ribs whose configuration is not determined by the mold cavity itself. In typical blow molding procedures the high pressure gas delivered internally of the molten parison pushes the parison out against the surface of the mold. The interior surface of the parison typically is configured the same as the external surface and is smooth as the entire inner surface of the parison is subject to the air pressure of the blowing gas. Thus, forming internal ribs which project radially inwardly from the inner surface of a blow molded part presents a significant problem in blow molding.

In many blow molding operations, a pin is used to help deliver the necessary gas under pressure internally of the blow molded part. As illustrated in the aforementioned U.S. patents, a relatively small diameter parison may be extruded and then one end opened out by means of mechanical fingers or the like. After one end of the parison has been opened out, a core or mandrel may be inserted into the parison. The core with its blow pin may extend the entire length of the parison and when the mold is closed there may be a tight fit between the blow pin of the core and the top of the mold to form a gas tight seal thereby permitting the gas pressure to build up inside the parison and perform the blow molding function.

When manufacturing parts such as constant velocity joint boots it is desirable to create a clamping surface on each end of the boot. One end of the boot is typically relatively small, while the other is considerably larger. The diameter of the larger end may be more than twice as large as the diameter of the small end. To make such a part, the core is introduced into the large end of a stretched parison with the mold closed. When the core and blow pin are in place, a further component of the mold often referred to as a slide is then closed against the core so that the dimension between the core and the closed slide then defines the second clamping surface. The first clamping surface may be formed between the pin and the closed mold.

Many bellows-like structures such as constant velocity joints may be attached to other components which need not necessarily have a cylindrical external configuration where the boot is to be clamped. Where the part involved does not have a cylindrical external configuration, a second component is required which provides an external cylindrical surface against which the boot may be clamped and an internal irregular surface to accommodate the hardware of the joint. In many cases because of the bearings used, the surface of the joint may be lobed rather than cylindrical.

With such situations it is then necessary to provide two parts, one to accommodate the lobes of the mechanical part and provide a clamping surface and then the boot which is to be clamped to the clamping surface.

There is, therefore, a need for a single product which provides a suitable external clamping surface and an internal irregular surface which can be configured to meet the requirements of the mechanical structure in association with which the product is to be used. Producing a product with an irregular, internal surface which is different from the external surface of the product is extremely difficult using conventional blow molding techniques. Convential blow molding techniques cannot be used to comprise a lobed internal surface on a portion having a cylindrical outer surface as the thermoplastic material will spread out evenly under the effect of the blowing pressure.

STATEMENT OF THE INVENTION

The process in accordance with this invention for manufacturing a product having a generally tubular configuration with first and second open ends which are generally axially aligned, said product having a bellows-shaped section and a skirt portion adjacent one of said first and second ends, includes the steps of extruding a parison of blow moldable thermoplastic resin between portions of a partible mold, closing said mold around said parison, blow molding said bellows portion and compression molding said skirt portion.

In accordance with another embodiment of this invention, a process for making a blow molded product in a mold which may be opened and closed comprises the steps of extruding a tubular thermoplastic resin parison which has first and second ends; closing the mold about the parison, introducing spreading means into the first end of the parison and spreading the first end of the parison to produce an enlarged opening at the first end, the parison having a wall thickness at the first end, supporting the parison at least adjacent the first end in the mold so that resin of the parison may not expand radially beyond the mold, introducing a core into the parison at the first end, the core having a portion with an outer surface adjacent the first end when the core is fully inserted which defines a clearance gap between the core and the closed mold. The gap being less than the wall thickness of the parison at the first end so that upon introduction of the core, a portion of the thermoplastic resin comprising the parison is moved by the core and the core and the mold define a first end of the product, thereafter introducing a pressurized gas into the parison to blow mold the product.

In accordance with another embodiment of the invention, a blow molded product has a generally hollow body portion with first and second open ends and the body portion having a flexible bellows-shaped portion intermediate the first and second ends, the first end comprises a skirt portion. The skirt portion is defined by a generally cylindrical wall, the wall having inner and outer surfaces, the product having a transition section intermediate the bellows shaped portion and the skirt portion. In accordance with a preferred embodiment of the invention the transition section includes an internal rib to reinforce the bellows portion immediately adjacent the transition section.

In accordance with another embodiment of the invention, a blow molded product has a generally hollow body portion with first and second open ends, the body portion having a flexible bellows-shaped portion intermediate the first and second ends, the first end comprising a skirt portion, the skirt portion being defined by a generally cylindrical wall, the wall having inner and outer surfaces. The inner and outer surfaces of the skirt portion have different configuration. In a particularly preferred embodiment of the invention, the outer surface of the skirt is generally cylindrical and the inner surface comprises a plurality of discrete lobes projecting inwardly from the generally cylindrical wall.

In order that the invention may be more clearly understood, reference will now be made to the accompanying drawings which illustrate preferred embodiments of the invention by way of example, and in which.

Figure 1:
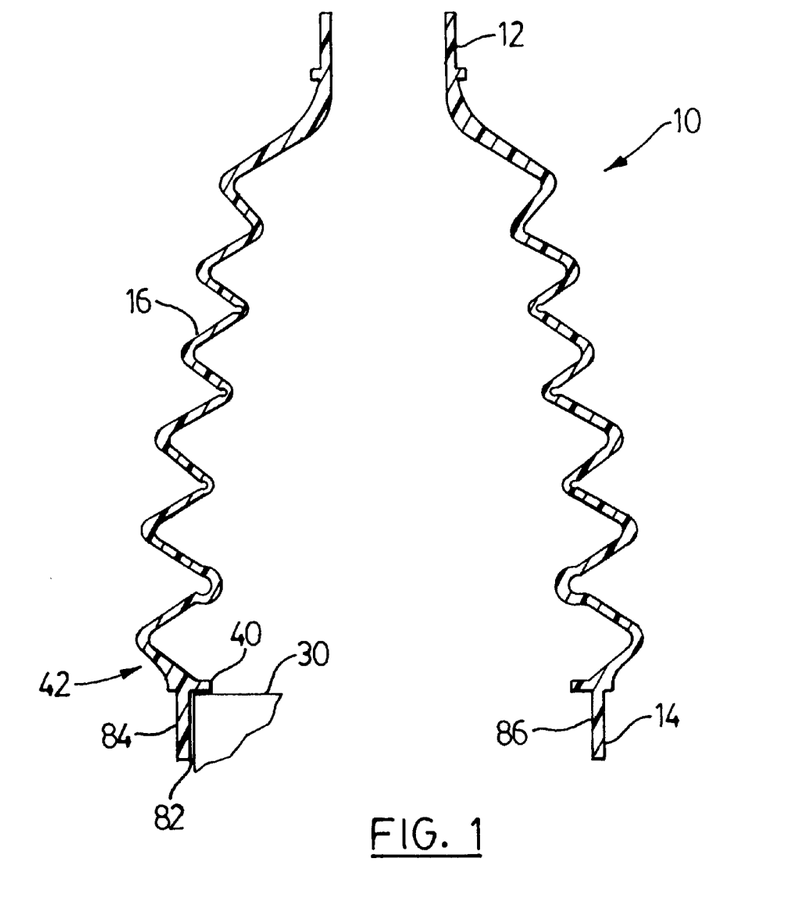
FIG. 1 illustrates a side elevation in section of a "boot" for a constant velocity joint in accordance with the invention, for clarity lines not in the plane of the section have been omitted.

FIG. 1 illustrates a boot in accordance with one aspect of the invention for use in a constant velocity joint. The boot is shown generally at 10 and has first and second tubular ends 12 and 14. In use, encircling clamps sometimes referred to as a hose clamp will be attached externally of the end 12 and externally of the end 14. The clamps will be tightened against the structure of the joint to form a tight seal so that lubricant contained within the boot 10 may not escape. The joint will include two shaft-like elements, one having a diameter equal to the diameter of end 12 and the other having a diameter equal to end 14. The boot 10 comprises a bellows-section 16 intermediate the first and second ends 12 and 14. The flexible bellows section accommodates the relative angular movement of the structural portions of the constant velocity joint.

Figure 2:
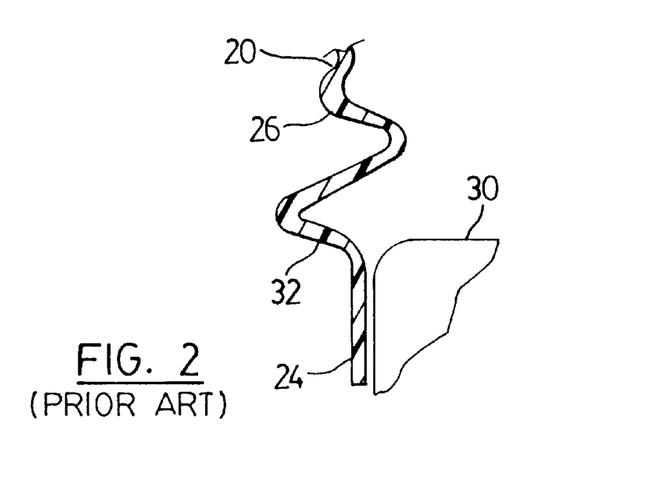
FIG. 2 is a view similar to FIG. 1 showing a prior art boot for a constant velocity joint.

FIG. 2 illustrates a prior art constant velocity joint boot similar to that in FIG. 1. The boot is shown generally at 20.

The boot 20 has a first end 22 and a second end 24. Similarly, as with FIG. 1, the boot of FIG. 2 would be clamped to the two elements of a constant velocity joint. The boot 20 comprises a bellows section 26 for retaining the lubricant of the constant velocity joint.

Each of FIGS. 1 and 2 illustrate a portion of a constant velocity joint shown with respect to the left hand wall of the sections. In each case the joint bears the numeral 30.

The transition region between the bellows section 26 and the skirt 24 indicated generally by the arrow 32 in FIG. 2 is a point of weakness in prior art boots. If the constant velocity joint, with its boot in place, is dropped or if another object is dropped onto the constant velocity joint with its boot or if a foreign object strikes the boot as the vehicle is driven and the area of impact is adjacent the area identified by arrow 32, the only material resisting the impact is the wall thickness of the boot 20 at that location. Because the boot 22 is made in conventional blow molding operations, the wall thickness of the boot 20 throughout the section 26 is relatively uniform. In order to provide greater resistance to failure at the location of arrow 32, it would be desirable to have additional material.

One of the major differences between the boot 10 in accordance with the present invention and the boot 20 of the prior art is the presence of substantial extra material in the vicinity of the region identified by arrow 42 as shown in FIG. 1. The extra material in the vicinity of arrow 42 is comprised of an internal rib 40. The rib 40 extends circumferentially around the inner surface of the boot 10 and projects substantially radially inwardly at the transition between the end 14 and the bellows section 16. The rib 40 is immediately adjacent the portion of the boot 10 that is shaped to its final configuration by the blow molding process. The rib 40 thus provides considerable extra material in the region immediately adjacent the location of that portion of the constant velocity joint 30, thereby strengthening the boot 10 substantially as compared to the boot 20 of the prior art. This improved boot provides improved impact resistance at the region of arrow 42 in a product where the bellows section 16 is manufactured in a blow molding process.

The steps to manufacture the boot 10 are shown diagrammatically in FIGS. 3 through 10.

Figure 3:
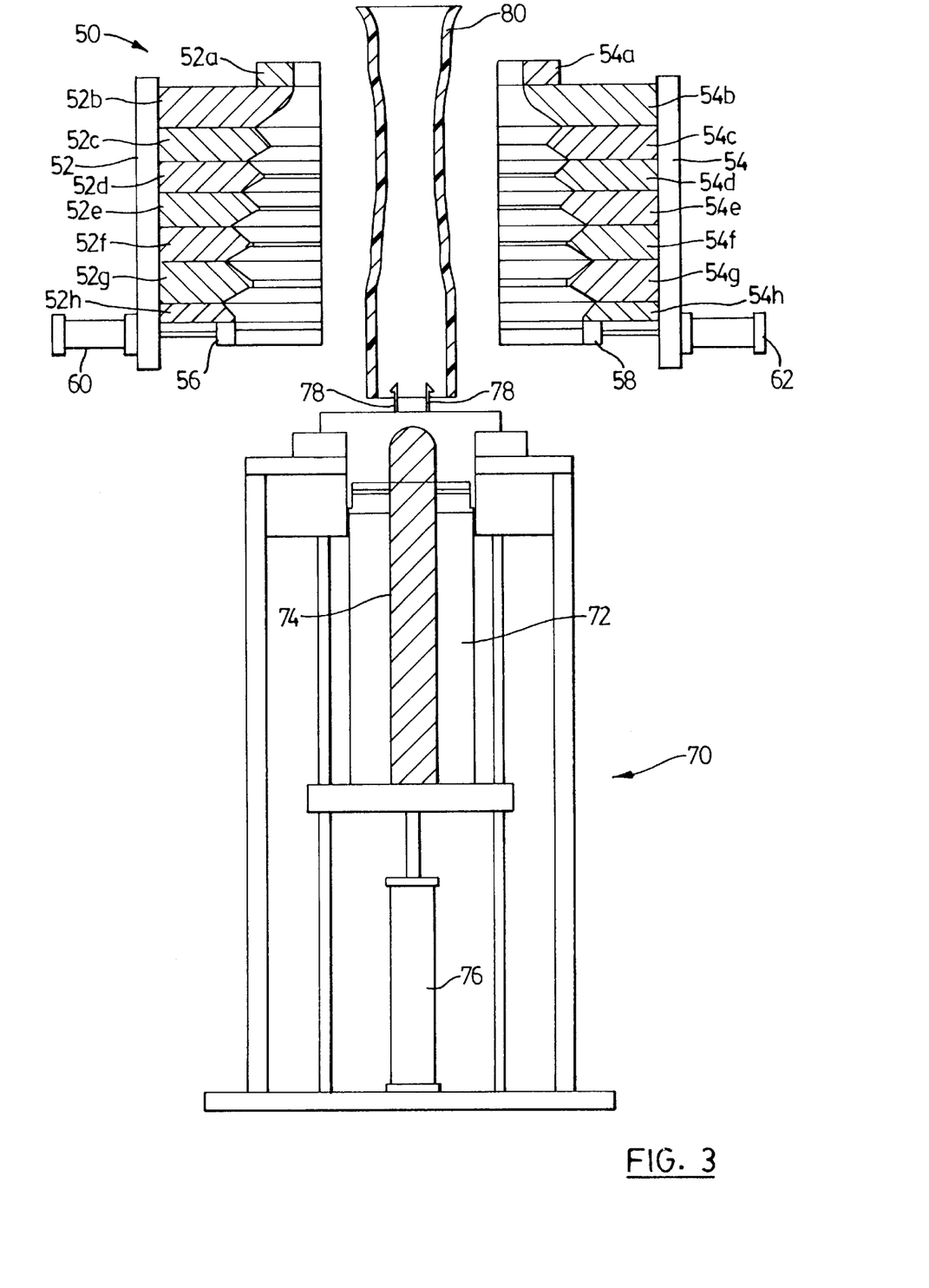
FIGS. 3 through 10 illustrate diagrammatically the steps of molding the product of FIG. 1 in accordance with the invention.

With respect to FIG. 3, the process involves a typical blow mold illustrated generally at 50. The mold 50 comprises partible mold halves 52 and 54. In order to provide a bellows-like configuration to the blow molded article, the mold halves 52 and 54 are made up of a plurality of segments and these are shown as segments 52A, 52B, 52C, 52D, 52E, 52F, 52G and 52H and similar segments 54A through H. The segments A through H of each of the mold halves are fixed to one another and move as a unit. The mold halves 52 and 54 each comprise a moving slide 56 and 58 respectively. The slides 56 and 58 may be moved independently of the sections 52A through H and 54A through H by means of cylinders 60 and 62. The mold 50 is a conventional mold which may be used to manufacture boots of prior art configuration as well as the new boots of this invention.

Located below the mold halves 52 and 54 there is a support pedestal illustrated generally at 70. The support pedestal comprises a movable core 72 which contains a movable blow pin 74. The support pedestal also includes a cylinder 76 which moves the core 72 vertically relative to the support pedestal 70.

The support pedestal 70 also comprises a pair of fingers 78 which are movable relative to one another and to the pedestal 70 in the horizontal direction.

The support pedestal 70 is located vertically below an extrusion head which is not illustrated in the figures. The mold halves when in the open position permit the extrusion of a parison 80 therebetween with the parison extending downwardly toward the support pedestal 70.

At the commencement of the procedure in accordance with the invention, the mold halves 52 and 54 are in their open position. The fingers 78 are drawn inwardly to their starting position.

It should also be noted that in contrast to conventional techniques, the slides 56 and 58 are in the extended position.

With all mechanical parts as shown in FIG. 3, the first step in the process is the extruding of the parison from the parison head. The parison is relatively small in diameter and hangs vertically from the extrusion head. The spacing of the fingers 78 is such that the parison drops over the fingers, the internal diameter of the parison is larger then the spacing between the fingers 78.

Figure 4:
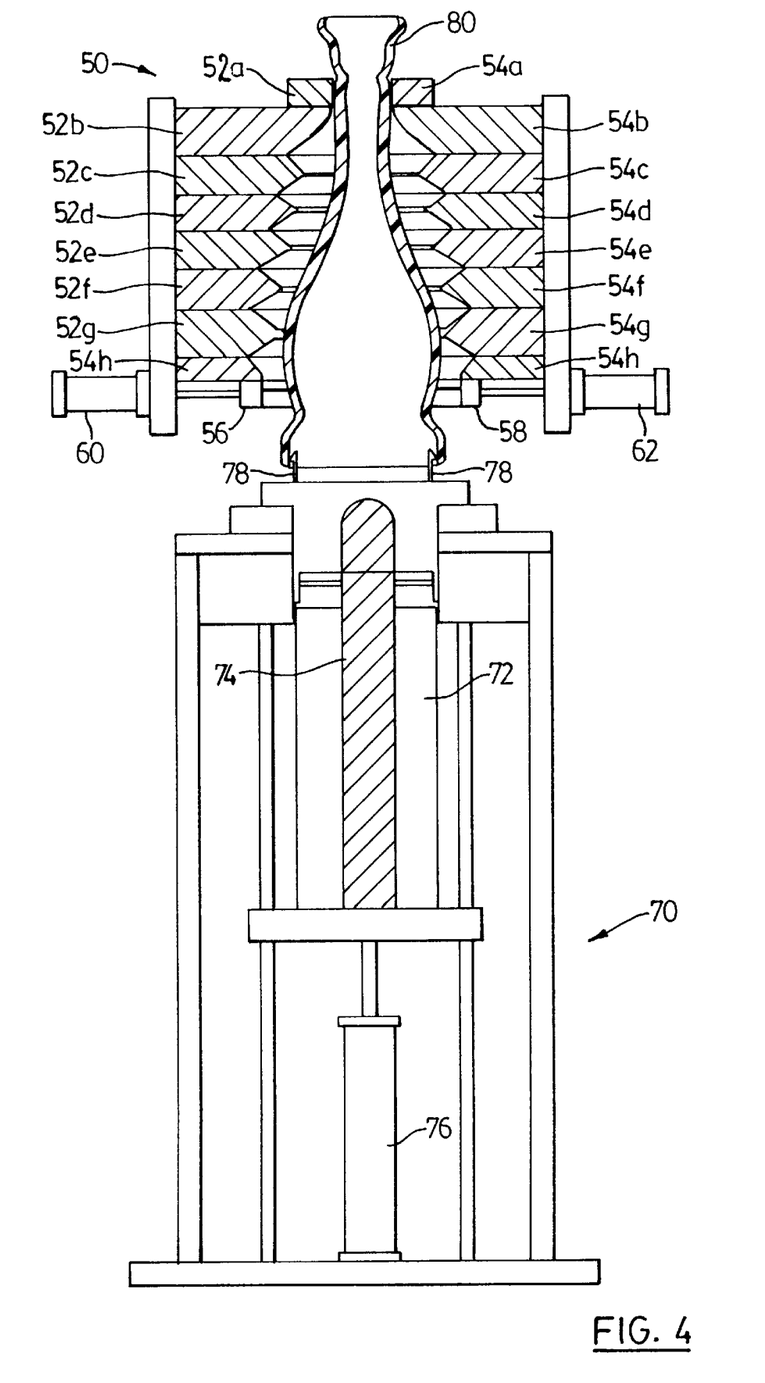

FIG. 4 shows the second stage in the process. As shown in FIG. 4, the fingers 78 have moved horizontally outwardly to create a relatively large diameter opening in the parison 80. The mold halves 52 and 54 have been closed to the final closed position and the slides 56 and 58 remain in the extended position.

Figure 5:
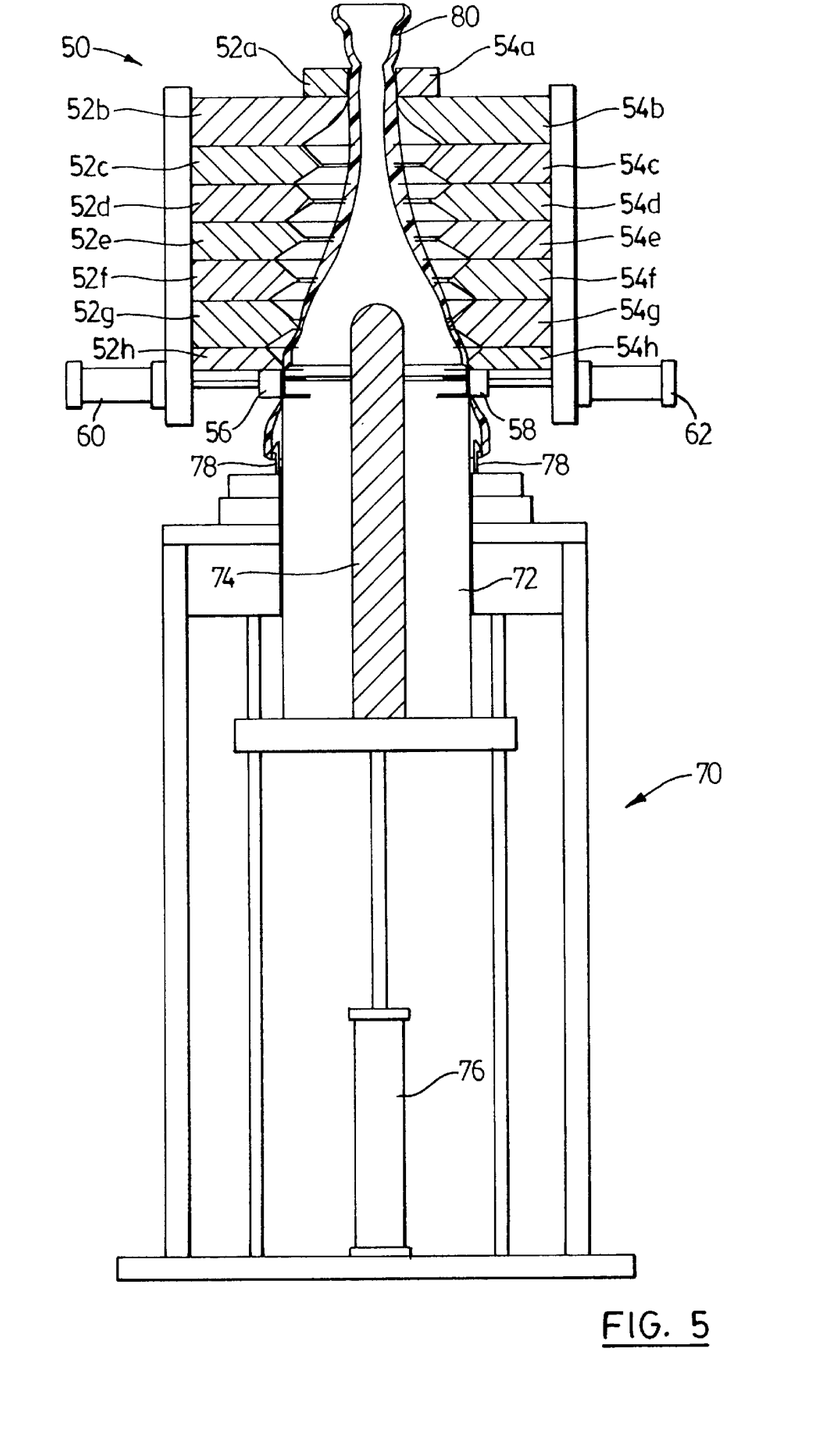

FIG. 5 shows the piston 76 having extended, moving the core 72 vertically upwardly between the fingers 78 and internally to the parison 80. The core 72 stops in the position shown in FIG. 5.

Figure 6:
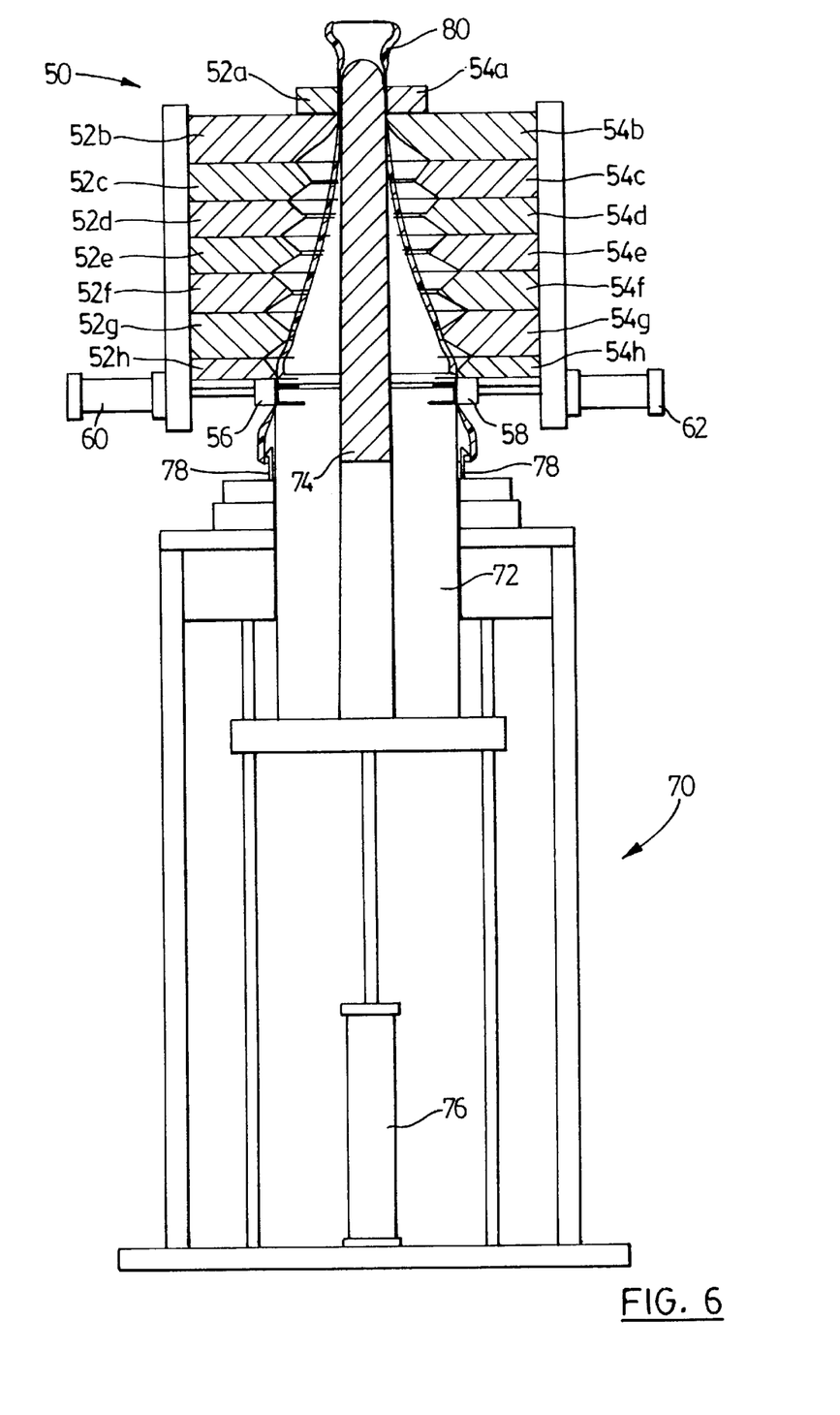

FIG. 6 illustrates the next stage of the forming process. In this stage the blow pin is extended vertically upwardly by means of a piston controlling relative movement between the blow pin 74 and the core 72. The blow pin moves upwardly to engage the wall of the parison adjacent the upper segments 52A and 54A of the mold halves 52 and 54, sealing the parison at the top. The interior of the parison is thus now sealed at both the first and second open ends.

Figure 7:
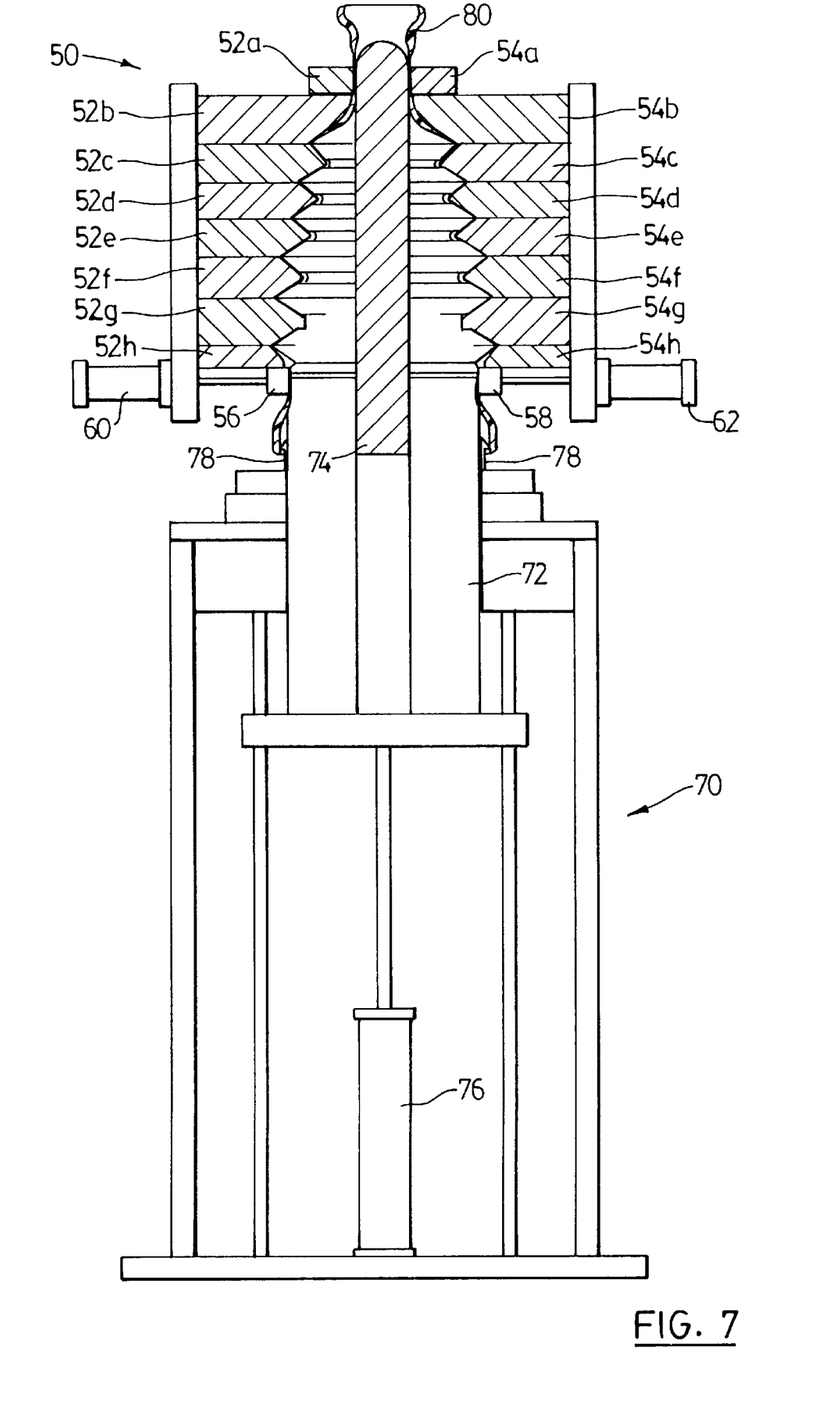

FIG. 7 shows the application of the blowing gas. The parison is expanded outwardly against the mold 50 to complete the shaping of the boot. This step is conventional and the techniques of blow molding conventionally used are applicable to this step.

Figure 8:
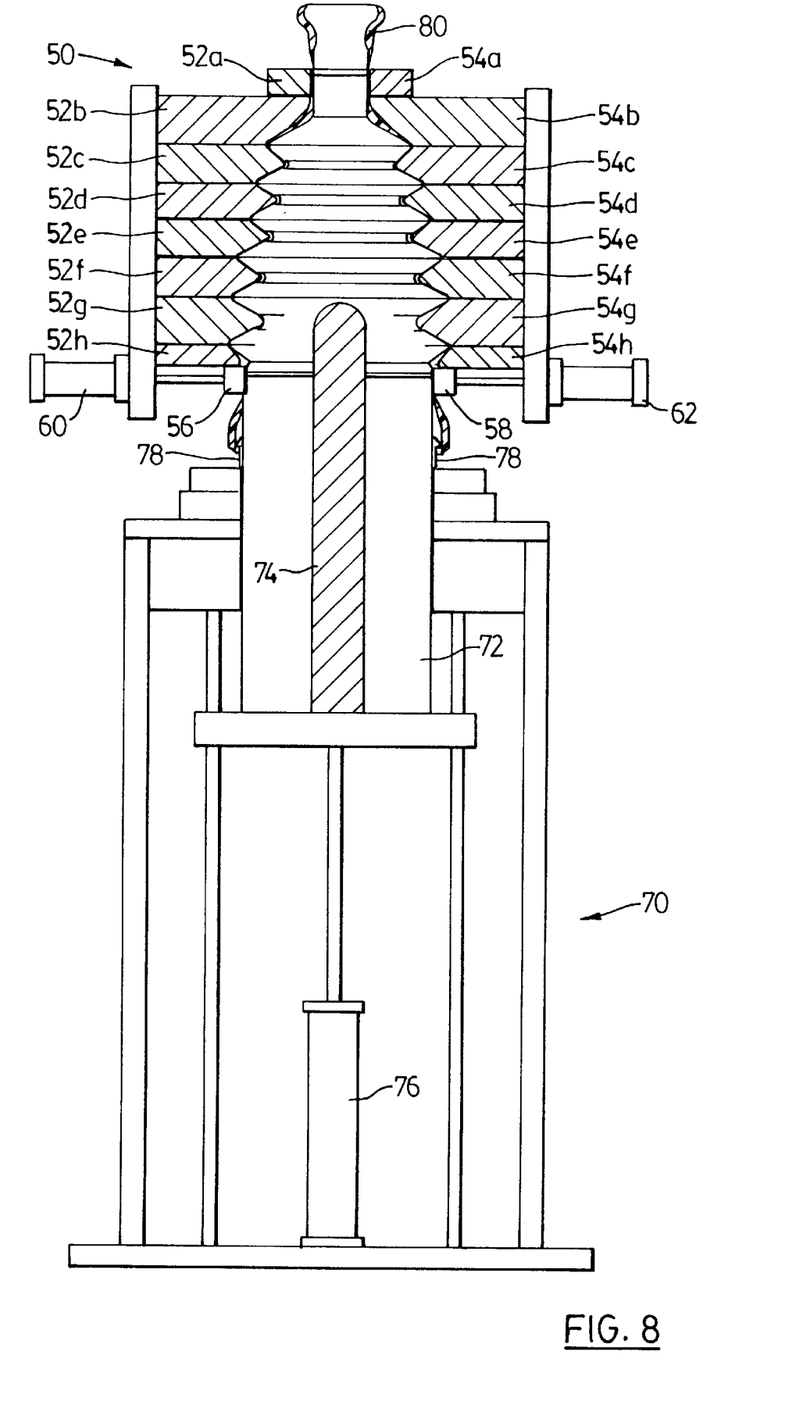

FIG. 8 shows the first stage of the retraction process. As shown in FIG. 8 the blow pin retracts within the core 72 after the blow pressure is released.

Figure 9:
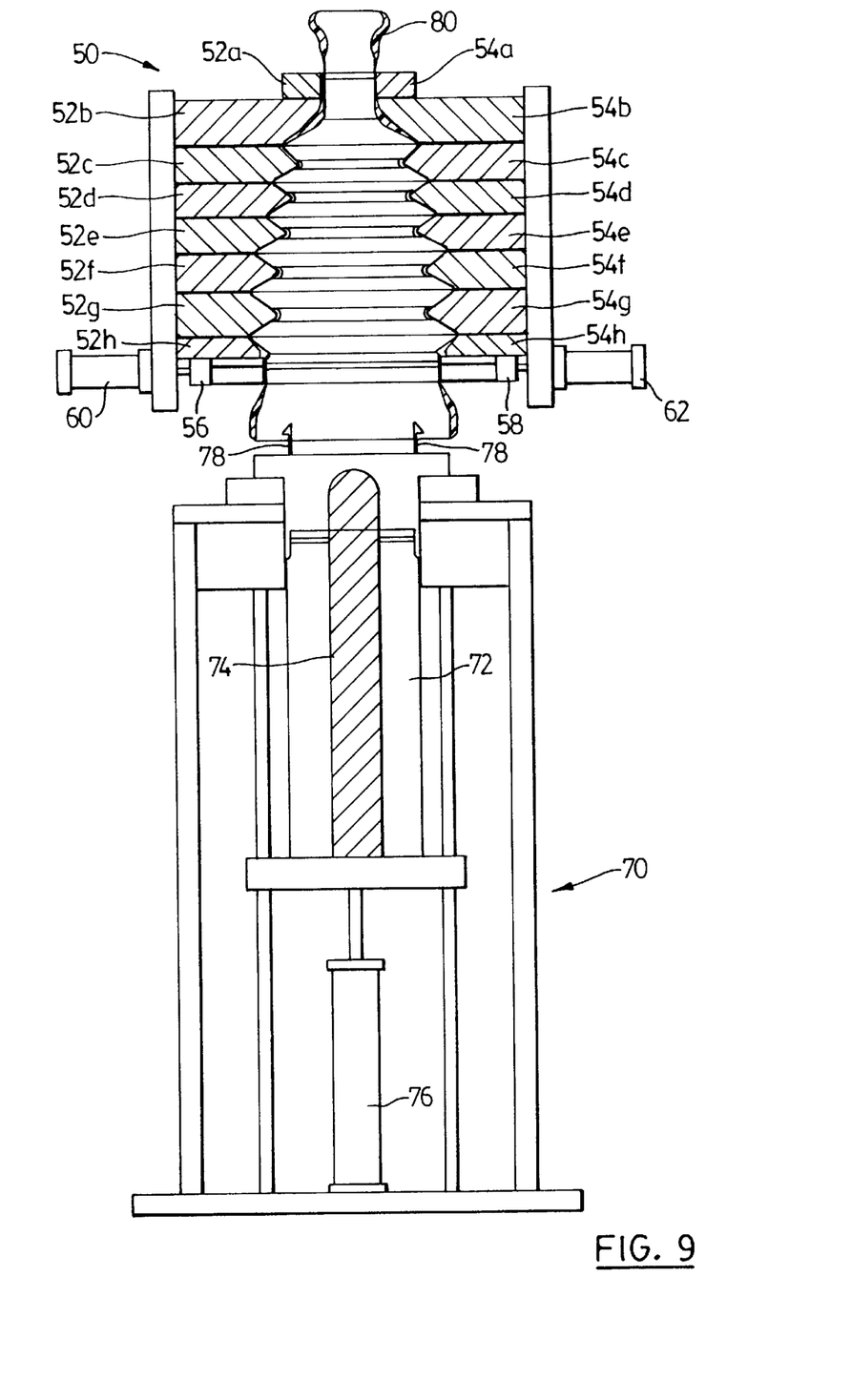

FIG. 9 shows the first stages of the mold opening. The slides 56 and 58 respectively, are moved to the retracted position. Moving the slides to the retracted position means that the outer surface of the parison adjacent the core 72 is no longer confined. After the slides have been retracted, the core 72 is withdrawn into the support structure 70 by collapsing of cylinder 76.

Figure 10:
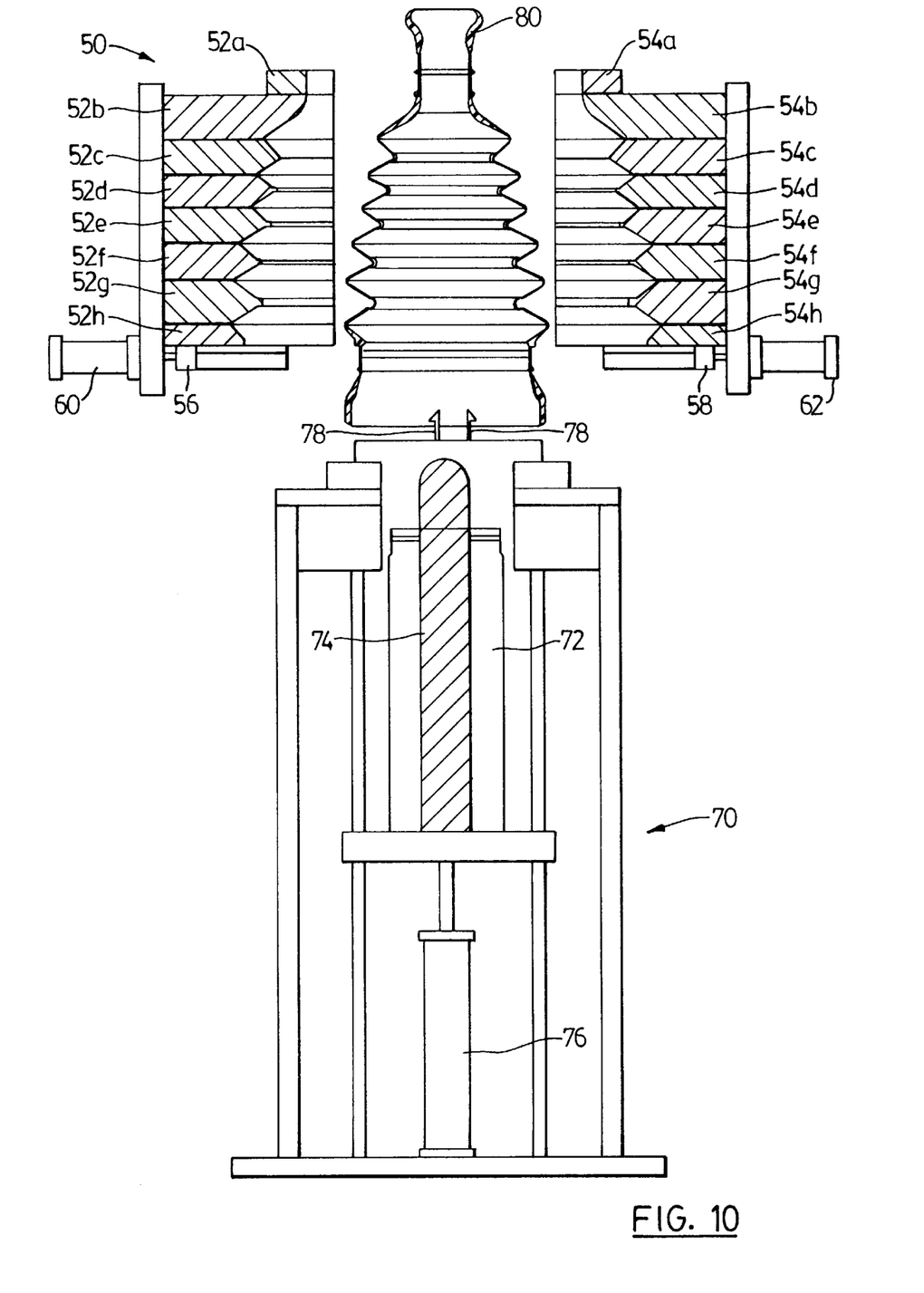

The final stage is shown in FIG. 10. In this stage, the fingers 78 are returned to the starting position and the mold halves 52 and 54 are opened so that the completed part may then be removed from the mold.

Once the part has been removed from the mold it is then trimmed for excess material at either end to give the finished part as shown in FIG. 1.

A particularly important part of the process occurs as illustrated in the process moving from FIG. 4 to FIG. 5. As shown in FIG. 4, the slides 56 and 58 are in the extended or closed position prior to vertical upward movement of the core 72. The fingers 78 hold the parison open read for entry of the core 72 within the parison. The wall thickness of the parison adjacent the slides 56 and 58 will be established in the parison extrusion process. The clearance between the slide 56 and the core 72 and between the slide 58 and the core 72 in each case, is less than the wall thickness of the parison 80 at that location. Accordingly, as the core 72 moves vertically upwardly, the core 72 forces movement of the thermoplastic material of the parison to permit entry of the core 72 into the mold 50. With reference to FIG. 1, it may be noted that the end 14 of the boot 10 comprises a skirt 82 having an external cylindrical surface 84. The configuration of the external surface 84 of the skirt is determined by the configuration of the slides 56 and 58. The internal configuration of the skirt 82, comprising the surface 86, is determined by the configuration of the core 72. The wall thickness of the skirt 82 is determined around the periphery of the core 72 by the relative spacing horizontally between the core 72 and the slides 56 and 58 respectively.

The final configuration of the skirt 82 is defined by the space between the core 72 and the slides 56 and 58. Because the parison 80 has a wall thickness as extruded, greater than the thickness of the skirt 82, some thermoplastic material must be caused to flow out of the way as the core 72 enters the space between the slides 56 and 58. The material of the wall of the parison 80 is forced to flow and in this example is moved vertically upwardly. That material is free to run over the top of the parison forming a pool of thermoplastic material sitting on top of the core 72. That pool of material on top of the mandrel, when cooled, comprises the rib 40.

The configuration of the skirt 82 is thus completed in the step shown in FIG. 5 before the blow pin moves into final position and before the blowing gas pressure is applied to the parison 80. Thus, the skirt 82 receives its final configuration, not from the blow molding pressure but rather from a compression molding procedure. The rib 40 is formed at the transition between the portion of the boot 10 which is compression molded, that is the skirt 82, and the portion of the boot 10 which is blow molded, that is, the bellows-like section 16.

This process produces a unique blow molded product. The blow molded product has an internal rib formed from the excess material left over from the compression molding procedure. That extra rib then provides a strengthened area for what is otherwise a blow molded part.

Figures 11, 13:
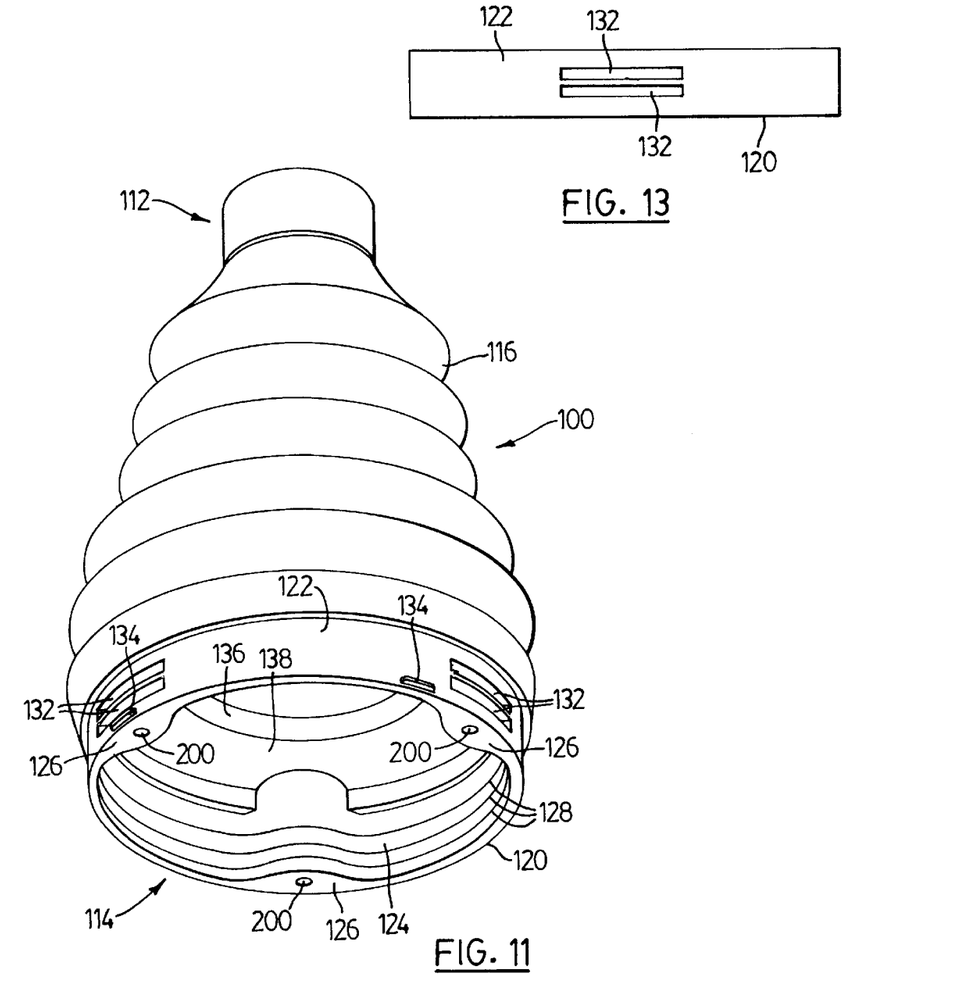
FIG. 11 is a perspective view of another embodiment of a "boot" for a constant velocity joint in accordance with the invention.
FIG. 13 illustrates a portion of the skirt of the boot of FIG. 11.

FIG. 11 illustrates a boot which is similar to that shown in FIG. 1 except that the larger diameter end 114 is considerably more complex than end 14 shown in FIG. 1. The same steps as diagrammatically illustrated in FIGS. 3 through 10 would be used to manufacture the boot shown in FIG. 11.

The boot 100 illustrated in FIG. 11 comprises a relatively narrow end portion 112 and a relatively large diameter end 114. The boot comprises a central bellows-like portion 116 intermediate the ends 112 and 114. The boot 100 comprises a skirt 120 at the first end 114. The skirt 120 has a substantially cylindrical outside surface 122. The internal surface 124 of the skirt 120 is generally cylindrical but with three lobes 126 extending radially inwardly from the cylindrical surface 124. In addition, the surface 124 comprises ribs 128 which extend radially inwardly from the surface 124. The ribs 128 may extend entirely around the periphery of the surface 124 including around the internal surface of the lobes 126.

The skirt 120 also comprises a pair of horizontal grooves 132 located in the external surface 122 adjacent each of the lobes 126. These are shown more clearly in FIG. 13. Finally, the skirt 120 may advantageously include three tabs 134 spaced about the periphery of the surface 122. These tabs extend radially outward from surface 122.

When viewed in the orientation shown in FIG. 11, it will be observed that the boot 100 comprises a generally annular rib 136 adjacent a surface 138. The surface 138 extends inwardly and upwardly from the skirt 120 toward the bellows-like portion 116. The rib 136 is at the transition between the surface 138 and the bellows portion 116.

Figure 12:
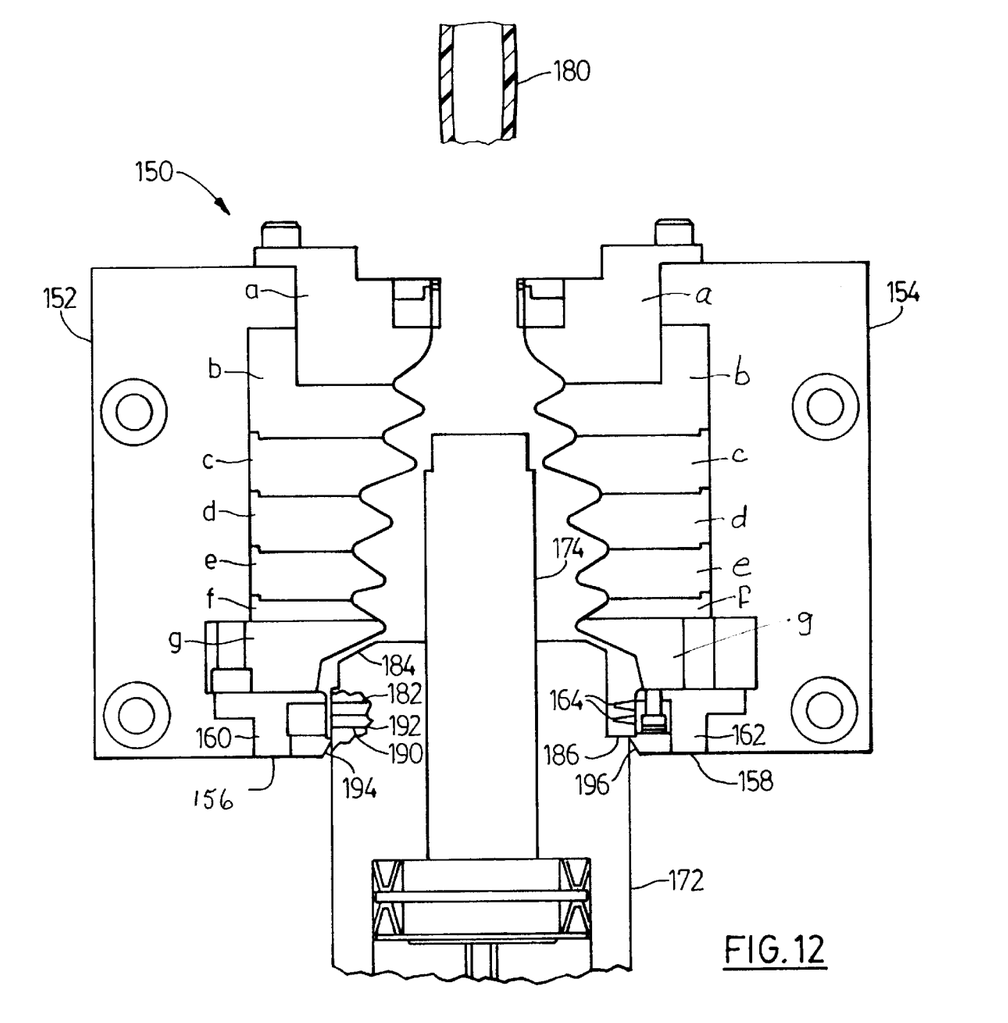
FIG. 12 illustrates a mold to manufacture the "boot" illustrated in FIG. 11.

The boot shown in FIG. 11 may be made using the process discussed in connection with FIGS. 3 through 10 by using the apparatus shown in FIG. 12. The apparatus of FIG. 12 is essentially similar to that diagrammatically shown in FIG. 3. The mold 150 comprises mold halves 152 and 154. The mold halves are segmented comprising sections 152A, B, C, D, E, F and G 154A, B, C, D, E, F and G. The mold 150 also comprises slides 156 and 158 respectively. The apparatus further includes a core 172 which is similar to core 72 shown in FIGS. 3 through 10. The core 172 is supported in a support structure which is not illustrated but which operates essentially similar to that shown in FIG. 3. The slides 156 and 158 are movable horizontally under control of pistons 160 and 162 respectively.

The slide 158 includes a pair of horizontally inwardly directed plates 164. The uppermost plate 164 is more clearly illustrated in FIG. 14.

Figure 15:
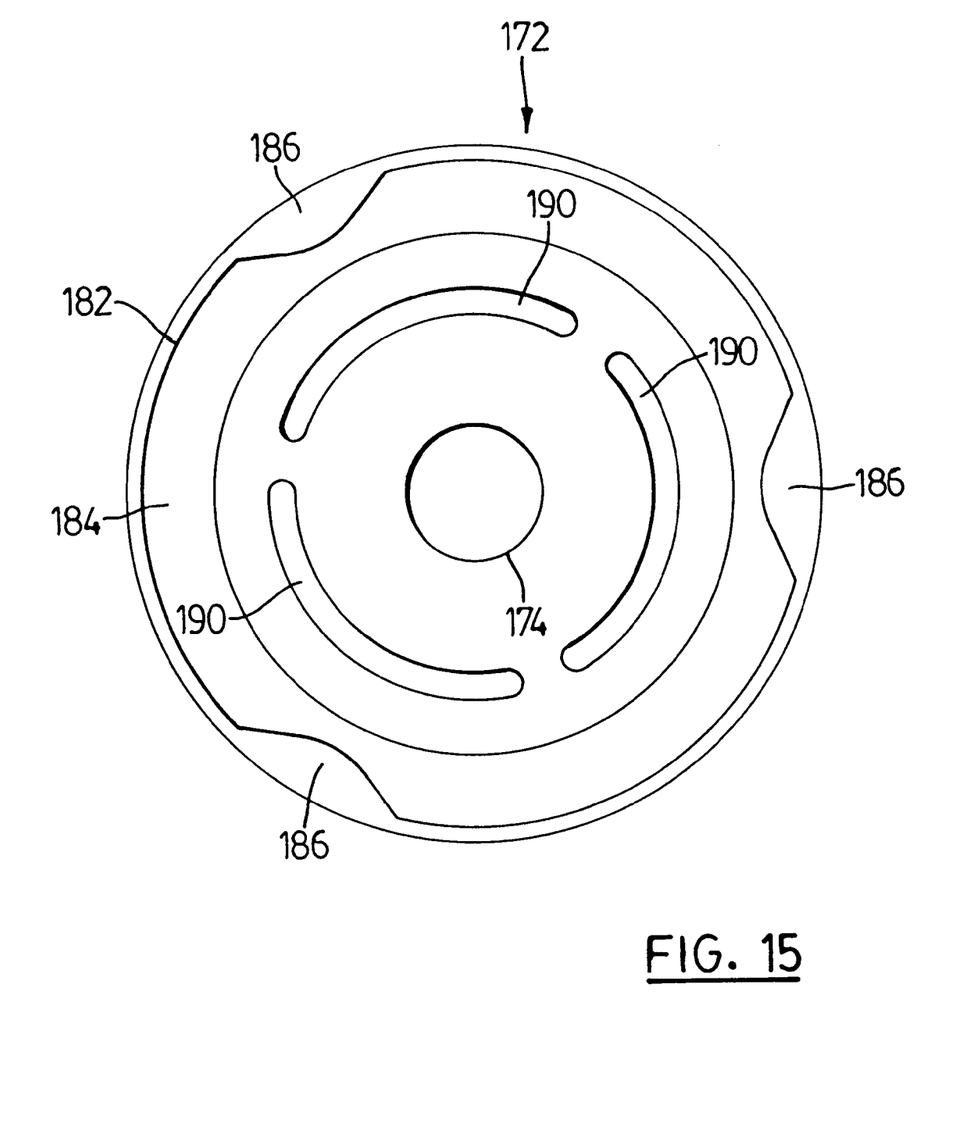
FIG. 15 is a top view of a core to be used in conjunction with the mold of FIG. 12 to make the boot of FIG. 11.

A top view of the core 172 is shown in FIG. 15.

As shown in FIG. 12, a parison 180 would be extruded to extend between the mold halves 152 and 154. The mold halves would be closed and the core 172 moved into position as discussed in connection with FIGS. 3 through 10. In FIG. 12, the parison material is not illustrated in order that the spacing between the core 172 and the mold 150 may be more clearly understood. Also, for the sake of clarity the surfaces of the mold which would be visible behind the plane of the section have not been illustrated.

As the core 172 moves into the mold 150, material from the wall of the parison is forced to move because the gap between the core 172 and the slide 156 and between the core 172 and the slide 158 is less than the wall thickness of the parison. As shown in FIG. 12, one of the lobes 126 is in the plane of the section. As the lobes are spaced around the periphery at 120° for the product shown in FIG. 11, there is not a lobe in the plane of the section between the slide 156 and the core 172. The core 172 comprises a surface 182 which is adjacent the slides 156 and 158. The core 172 further comprises a surface 184 which is adjacent the mold segments 152G and 154G. There is also a substantially horizontal surface 186 on the core 172 which is adjacent the fingers 164 of the slide 158.

As the core 172 moves into its final position, material from the wall of the parison is forced to flow under compression into the space comprised between the surfaces 182, 184 and 186 of the mandrel and the surfaces of the slides 156 and 158 and the surfaces of the mold sections 152G and 154G. With reference to FIG. 11, this space represents the skirt 120 and the surface 138 of the boot 100 shown in FIG. 11. The surface 182 is generally cylindrical and defines what will become the surface 124 of the skirt 120. The surface 182 defines the three lobes 126 as well as the ribs 128. The ribs 128 illustrated in FIG. 11 are formed by grooves 190 in the surface 182. Only a portion of the grooves 190 is shown opposite slide 156. The small section indicated by the line 192 indicates a portion of the core 172 which has not been sectioned for the view of FIG. 12. In this example, which has 3 lobes 126, there will be three surfaces 186 and three sets of plates 164. The relieved areas or voids which form the lobes are shown in FIG. 15. The voids are adjacent the surfaces 186.

The core 172 fits snugly against the edge 194 and the edge 196 of the slides 156 and 158 respectively. The edges 194 and 196 are substantially semi-circular. Small voids in the slides 156 and 158 may be provided to define the tabs 134. The tabs 134 may be useful in retaining the hose clamp in its desired position prior to tightening the clamp when the boot is being installed.

With reference to FIG. 12 it will be appreciated that as the core 172 enters the mold 150, the surface 186 will help to form the lobe 126. The grooves 132 are formed in the external surface of the skirt 120 by reason of the fingers 164. The thermoplastic material that is captured between the core 172 and the slides 156 and 158 as well as the mold sections 152G and 154G is subjected to compression and may flow radially, axially and circumferentially in the space defined by these surfaces. This forms the ribs 128, the lobes 126 and the grooves 132. Any excess material forced out of the space then forms the rib 136 comprised of material which flows onto the top of the core 172.

The plates 164 form the grooves 132. The grooves 132 are advantageous in that larger lobes 126 may be formed. The lobes 126 and the ribs 128 must all be made from the material which comprises the wall thickness of the parison. There are practical limits as to how much material can be included in the parison. Accordingly, where larger lobes are required to define the internal surface 124, the lobes can be made, in part, hollow. One effective way of making the lobes in part hollow is by use of the grooves 132. Alternatively, the lobes could be made hollow by pins projecting vertically upwardly from the surfaces 186. This would leave a void in the lobe 126. These voids are shown in FIG. 1 as 200. In certain circumstances, depending upon the size of the lobes it may be possible to utilize both the plates 164 and pins on the surface 186 to create both vertically extending voids 200 and horizontally extending grooves 132. However, in many cases it will not be possible to use both, as the pins would interfere with the plates 164. Typically, these will be considered alternatives.

To blow mold the bellows section 116 blowing gas may be introduced into the parison through slots 190 in the core 172.

In order to open the mold without damaging the molded part, the slides 156 and 168 are first retracted. This removes the plates 164 from the grooves 132 and also permits radial expansion of the skirt 120 as needed. The core 172 may then be withdrawn without damaging the ribs 128 or the lobes 126.

Figure 14:
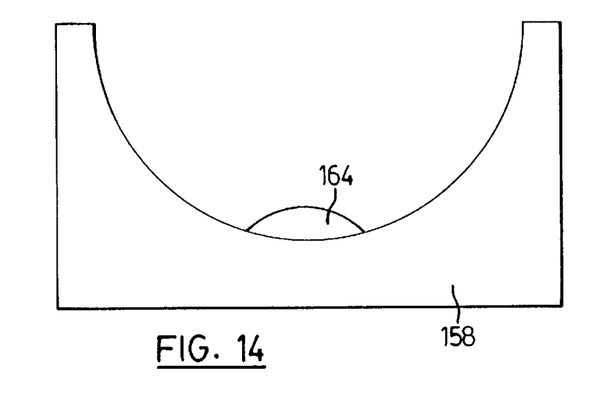
FIG. 14 is a top view of a portion of a slide which is part of the mold illustrated in FIG. 12.

As shown in FIG. 14 the plates 164 are fixed to the slides 156 and 158. Slides 156 and 158 are extended before the core 172 is moved into place. Alternatively, plates similar to plates 164 could be mounted on additional slides or could be constructed as separately moveable parts of the slides 156, 158. In this case, the thermoplastic material would be forced under compression into the voids of the core creating the lobes 126 in a first stage. The additional slides or parts could then be moved into place to form the groove 132. This may be advantageous depending on the size and configuration of the lobes 126.

Both in the embodiment shown in FIG. 12 and the embodiment shown in FIGS. 3 through 10, the narrower end 12 or 112 of the boot is formed by the space between the blow pin 74 and the mold sections 52A, 54A or the blow pin 174 and the mold sections 152A, 154A. The ends 12 and 112 are thus each formed in a similar compression mold procedure to determine the final size and configuration of the smaller diameter ends of the boots 10 and 100 respectively.

Any excess material from the parison is forced up and out the boot to be cut off as scrap. Thus, in accordance with these embodiments of the invention, the mold 50/150 and core 72/172 together with the blow pin 74/174 permit the compression molding of the first and second ends of the boots 10/100 and blow molding of the flexible portions 16/116. This results in a product which is essentially blow molded but which may have a configuration which is not typically possible in blow molding operations. Particularly with reference to the boot 100 shown in FIG. 11; a part which utilizes blow molding techniques may be provided in which the internal and external surfaces are different. In some cases, this may eliminate the need for a second part. The boot of FIG. 11 thus provides a skirt which has a substantially cylindrical external configuration suitable for accepting a hose clamp. The internal surface of the skirt 120 can be provided with a convoluted shape having one of more projections extending inwardly which are suitable for interacting with a non-cylindrical surface of the object to which the boot is to be clamped.

It will be appreciated that using the method and apparatus described herein it is possible to create a flexible blow molded bellows-like product having a non-cylindrical internal surface. Any thermoplastic material capable of being used in a blow molding operation including HYTREL may be used for the parison. Differing internal configuration as compared to the external configuration gives great flexibility to the design to strengthen blow molded parts and to accommodate differing shapes in mating parts.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

We claim:

1. A process for making a blow moided product in a mold which may be opened and closed comprising:
   a) extruding a tubular thermoplastic resin parison having first and second ends, said parison having a general axis of symmetry and said parison having a wall thickness at said first end;
   b) closing said mold about said parison;
   c) introducing spreading means into said first end of said parison and spreading said first end of said tubular parison to produce an enlarged opening at said first end;
   d) supporting said parison at least adjacent said first end in said mold so that resin of said parison may not expand radially; and then,
   e) introducing a core into said parison at said first end, said core having a portion with an outer surface adjacent said first end when said core is fully inserted which defines a clearance gap between said closed mold and said outer surface and said clearance gap is less than the wall thickness of said parison at said first end so that upon introduction of said core, a portion of thermoplastic resin comprising said parison is moved by said core in the direction of motion of said core and said core and said mold define a first end of said product;
   f) introducing said core into said second end of said parison so that said core and said mold define the inner and outer surfaces of said molded product adjacent said first and second ends, and then, g) introducing a pressurized gas into said parison to blow mold said product.

2. A process according to claim 1 wherein said mold includes compression slides defining the molding surface of said mold adjacent said first end of said product and said compression slides are moved to the extended position before said core is introduced into said parison.

3. A process according to claim 2 in which said portion of said thermoplastic resin is moved in a direction which is generally parallel to said axis of said parison.

4. A process according to claim 3 in which at least some of the resin material which is moved by said core comprises a projection on the internal surface of said molded product.

5. A process according to claim 4 in which said projection is a continuous rib.

6. A process according to claim 4 in which said projection is an circumferential rib extending around the internal molded surface of said product.

7. A process according to claim 2 in which said portion of said thermoplastic resin is caused to flow in a direction which is generally radial to the axis of said parison.

8. A process according to claim 2 in which said portion of said thermoplastic resin is caused to flow generally radially and circumferentially with respect to said axis.

9. A process according to claim 7 wherein said core comprises at least one void on a surface of said core adjacent said mold so that upon introduction of said core into said parison, at least a portion of said thermoplastic material may flow into said at least one void.

10. The process of claim 2, wherein after said pressurized gas is introduced into said parison, said compression slides are moved to a retracted position and then said core is removed from within said first end of said product.

11. The process of claim 9, wherein said core includes at least one void on said outer surface of said core for defining at least one internal projection on said product, so that upon introducing said core into said parison, a portion of said thermoplastic material flows into said void.

12. The process of claim 11 wherein said void in said core is an annular groove so that said moulded product comprises at least one rib on the internal surface of said product adjacent said first end of said product.

13. A process according to claim 7 said mold having additional compression slides adjacent said first end; said process including moving said additional compression slides from a retracted position to an extended position after said core has been introduced into said parison.

14. A process for making a blow molded product in a mold which may be opened and closed comprising:

a) extruding a tubular thermoplastic resin parison having first and second ends, said parison having a general axis of symmetry and said parison having a wall thickness at said first end;

b) closing said mold about said parison;

c) introducing spreading means into said first end of said parison and spreading said first end of said tubular parison to produce an enlarged opening at said first end;

d) supporting said parison at least adjacent said first end in said mold so that resin of said parison may not expand radially; and then, e) introducing a core into said parison at said first end, said core having a portion with an outer surface adjacent said first end when said core is fully inserted which defines a clearance gap between said closed mold and said outer surface and said clearance gap is less than the wall thickness of said parison at said first end so that upon introduction of said core, a portion of thermoplastic resin comprising said parison is moved by said core in the direction of motion of said core and said core and said mold define a first end of said product; and then, f) introducing a pressurized gas into said parison to blow mold said product, and wherein said mold includes compression slides defining the molding surface of said mold adjacent said first end of said product and said compression slides are moved to the extended position before said core is introduced into said parison, and said portion of said thermoplastic resin is caused to flow in a direction which is generally radial to the axis of said parison, and said mold having additional compression slides adjacent said first end; said process including moving said additional compression slides from a retracted position to an extended position after said core has been introduced into said parison.

\* \* \* \* \*